United States Patent [19]
Phillips

[11] Patent Number: 5,813,906
[45] Date of Patent: Sep. 29, 1998

[54] METHOD AND MEANS OF SELECTING A STUFFING HORN FOR A SAUSAGE ENCASING MACHINE WITH A SHIRRED CASING TO BE USED IN THE MACHINE

[75] Inventor: Robert Wright Phillips, Waukee, Iowa

[73] Assignee: Townsend Engineering Company, Des Moines, Iowa

[21] Appl. No.: 872,690

[22] Filed: Jun. 11, 1997

Related U.S. Application Data

[60] Provisional application No. 60/020,080 Jun. 13, 1996.
[51] Int. Cl.⁶ ................................................. A22C 11/00
[52] U.S. Cl. ............................................. 452/36; 452/45
[58] Field of Search ................................ 452/45, 46, 36

[56] References Cited

U.S. PATENT DOCUMENTS

| | | | |
|---|---|---|---|
| 408,945 | 8/1889 | Wilder | 452/36 |
| 888,305 | 5/1908 | Bussinger | 452/45 |
| 1,043,241 | 11/1912 | Louden, Sr. | 452/36 |
| 2,168,693 | 8/1939 | Walter | 452/45 |
| 2,660,755 | 12/1953 | Zaenkert | 452/45 |
| 4,505,003 | 3/1985 | Becker et al. | 452/45 |

FOREIGN PATENT DOCUMENTS 3455  12/1895  United Kingdom ..................... 452/45

*Primary Examiner*—Willis Little
*Attorney, Agent, or Firm*—Zarley, McKee, Thomte, Voorhees & Sease

[57] ABSTRACT

A wall panel on a sausage encasing machine has a plurality of apertures with corresponding indicia marks indicating the direction of the apertures. The apertures match sizes of outside diameters of sausage stuffing tubes usable with the machine. This permits the operator to know that a given aperture has a corresponding given diameter. When the casing has been chosen for a sausage run on a particular machine, the operator selects a stuffing horn of a diameter that he or she believes to be appropriate for the casing being used. If a stuffing tube having a diameter of 0.576 of an inch is required, the operator takes the tube that he or she has selected and inserts it through the aperture on the machine that has a 0.576 inch indicia mark adjacent thereto. If the stuffing tube in the operator's hands is loose in the aperture selected, or if it will not even go into the aperture selected, the operator will know immediately that the wrong stuffing tube has been selected. The process is repeated until the operator finds a stuffing tube that completely fits the 0.576 inch aperture in the wall of the machine. When it is confirmed that the correct stuffing tube has been selected, it is placed within the machine with the predetermined selected casing thereon, and the sausage stuffing process is then carried on.

8 Claims, 2 Drawing Sheets

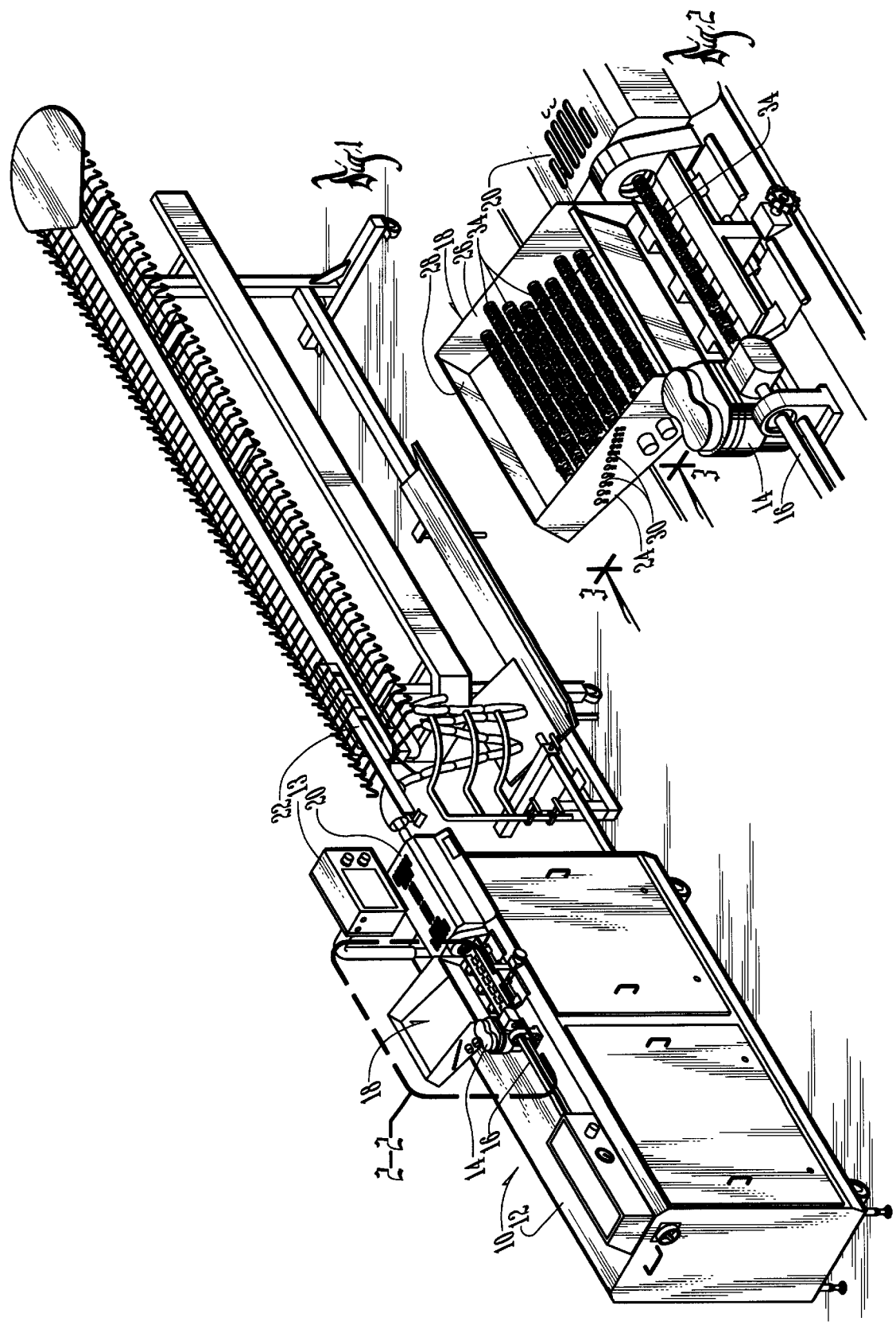

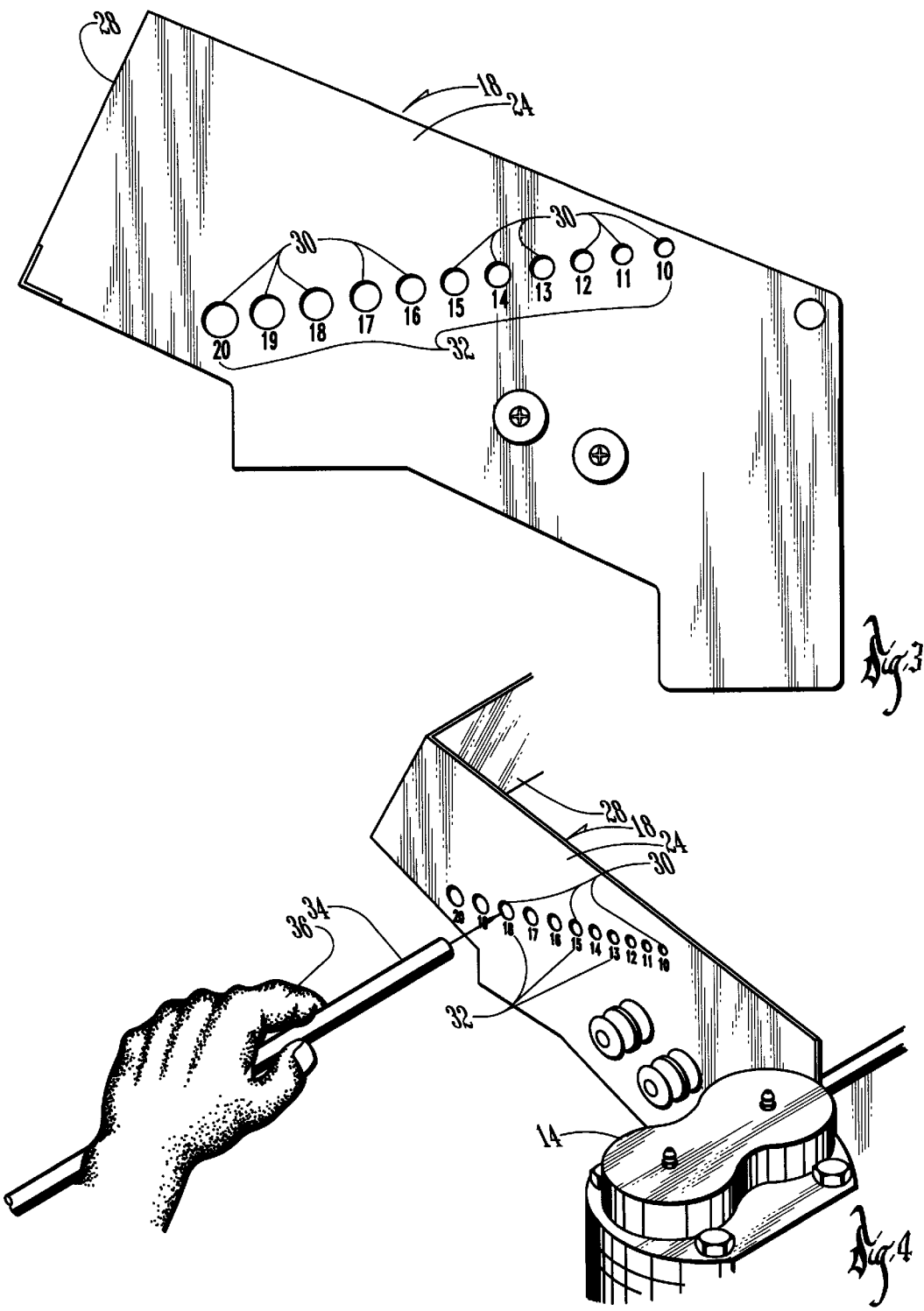

METHOD AND MEANS OF SELECTING A STUFFING HORN FOR A SAUSAGE ENCASING MACHINE WITH A SHIRRED CASING TO BE USED IN THE MACHINE

CROSS-REFERENCE TO A RELATED APPLICATION

This application is a continuation of Ser. No. 60/020,080 filed on Jun. 13, 1996 and Ser. No. 60/044,350 filed on Apr. 29, 1997.

BACKGROUND OF THE INVENTION

Sausage encasing machines utilizing a pump for delivery of a meat emulsion to a hollow stuffing tube upon which a shirred casing is mounted for filing the casing and providing a string of linked sausages are well known in the art. The shirred casings are elongated tubes that are telescopically compressed and which have an interior diameter when compressed to match the outside diameter of the stuffing tube upon which they are mounted. A given sausage encasing machine is adapted to make sausages of varying diameters, and each diameter is determined by the effective diameter of the casing being utilized. In order to accommodate this process of making sausages of different diameters, a special stuffing tube must be used each time a different casing is used because it is critical that the outside diameter of the stuffing tube match the interior diameter of the shirred casing.

Typically, the size of the ultimate elongated sausages will be predetermined, and this is done by selecting a shirred casing having a known diameter both in its shirred condition and in its filled condition. After determining which casing should be used, the operator then must select a stuffing tube which has an outer diameter that perfectly matches the interior diameter of the shirred casing. Because the outer diameter of the stuffing tubes vary so little between casings of different sizes, it is very important that the proper stuffing tube be utilized with the chosen casing. The numerical size of the diameter of the stuffing tube is typically not shown or otherwise displayed on the stuffing tubes themselves. The operator must therefore select the stuffing tube visually based upon his or her experience, and errors sometimes result. Using the wrong stuffing tube with a given size casing will produce an inferior encased sausage.

Therefore, it is a principal object of this invention to provide a quick and easy method and means for the operator to confirm the actual outside diameter of the stuffing tube being chosen.

This and other objects will be apparent to those skilled in the art.

SUMMARY OF THE INVENTION

A plurality of apertures of different diameters are placed in a wall panel in the sausage encasing machine with corresponding indicia marks visible on the panel to permit the operator to know that a given aperture has a corresponding given diameter. When the casing has been chosen for a sausage run on a particular machine, the operator selects a stuffing horn of a diameter that he or she believes to be appropriate for the casing being used. If a stuffing tube having a diameter of 0.576 of an inch is required, the operator takes the tube that he or she has selected and inserts it through the aperture on the machine that has a 0.576 inch indicia mark adjacent thereto. If the stuffing tube in the operator's hands is loose in the aperture selected, or if it will not even go into the aperture selected, the operator will know immediately that the wrong stuffing tube has been selected. The process is repeated until the operator finds a stuffing tube that completely fits the 0.576 inch aperture in the wall of the machine. When it is confirmed that the correct stuffing tube has been selected, it is placed within the machine with the predetermined selected casing thereon, and the sausage stuffing process is then carried on.

BRIEF DESCRIPTION OF THE DRAWINGS

FIG. 1 is a perspective view of a sausage encasing machine;

FIG. 2 is an enlarged perspective view of the portion of the sausage encasing machine encircled by section lines 2—2 of FIG. 1;

FIG. 3 is a side elevational view of the hopper of a sausage encasing machine as taken on lines 3—3 of FIG. 2; and FIG. 4 is a partial perspective view of the hopper of this machine showing the operator practicing this invention.

DESCRIPTION OF THE PREFERRED EMBODIMENT

The numeral 10 designates a typical sausage encasing machine having a frame 10, a control panel 13 including a computer screen, a meat emulsion pump 14, a slidable stuffing tube 16, a casing hopper 18, a linker housing 20 enclosing a conventional sausage linker (not shown) all connected to a sausage conveyor 22. Again, the foregoing structure represents typical modern existing conventional sausage encasing machines and the foregoing structure does not of itself constitute this invention.

As best shown in FIG. 2, the hopper 18 has opposite side walls 24 and 26 connected by a rear wall 28. A plurality of apertures 30 of different diameters are punched or otherwise formed in wall 24 of hopper 18. Indicia marks 32 which can be numbers directly or indirectly reflecting the diameter of the apertures 30 are located immediately opposite the apertures to which their value corresponds. The eleven apertures 30 have the following range of diameters in inches: 0.638; 0.606; 0.576; 0.544; 0.514; 0.483; 0.450; 0.421; 0.388; 0.358; and 0.325.

It should be understood that the stuffing tubes 16 are slidably mounted on the machine 10 and stuffing tubes of different diameters can be utilized on the machine. Similarly, shirred casing tubes 34 of varying sizes can be utilized in the operation of machine 10 provided that they are matched with stuffing tubes 16 of a corresponding diameter as will be more fully described hereafter.

In operation, if the specifications for the sausage run require a casing having a given and predetermined interior diameter (as well as a predetermined expanded diameter), it is necessary for the operator to utilize a stuffing tube which corresponds to this interior diameter of the shirred casings. That diameter is readily known and is usually indicated on the package in which the shirred casings are available. If the interior diameter of the chosen casings is 0.576 of an inch, the operator must select a stuffing tube 16 with an outer diameter of 0.576 of an inch. As previously discussed, the operator will visually endeavor to select a stuffing tube having a proper diameter. However, to insure that he or she has selected the correct stuffing tube, he or she will insert it in the aperture 30 in the hopper 18 to see if the selected tube will easily fit into that aperture. If the operator finds that the selected tube fits loosely in the selected aperture, or will not even enter the selected aperture, it will be kown that the wrong stuffing tube has been selected. Another tube is selected until a tube corresponding to the aperture having a 0.576 outside diameter has been located.

It has been found that this structure and method have been very satisfactory in efficiently allowing the operator to confirm that he or she has selected a stuffing tube of correct dimensions.

Accordingly, it is seen that this invention will achieve at least all of its stated objectives.

What is claimed is:

1. A sausage stuffing machine having a pump for connection to a source of meat emulsion for delivery of said meat emulsion to a linking means through an elongated detachable hollow stuffing tube with an elongated shirred telescopically formed casing tube having an effective interior diameter when shirred coinciding with the outside diameter of said stuffing tube, comprising, said machine having a substantially flat wall member mounted thereon, a plurality of apertures in said panel having diameters corresponding to the outer diameters of a plurality of different sized stuffing tubes usable on said machine with indicia on said wall member adjacent said apertures indicating the diameter thereof, so that when a given shirred casing tube having a known interior diameter is to be used in said machine, the operator of the machine can select a stuffing tube which has an outer diameter corresponding to the interior diameter of said known interior diameter of said casing, and wherein said operator can confirm the actual outside diameter of the selected stuffing tube by inserting it through an aperture in said wall of corresponding to interior diameter of said given shirred casing tube.

2. The machine of claim 1 wherein said apertures are located in a wall member of a hopper on said machine adapted to hold shirred casing tubes.

3. The machine of claim 1 wherein said apertures are arranged in a substantially straight line.

4. The machine of claim 2 wherein said apertures are arranged in a substantially straight line.

5. The machine of claim 1 wherein said wall member is a thin panel on said machine.

6. The machine of claim 3 wherein said wall member is a thin panel forming a side wall of said hopper.

7. A method of confirming the outside diameter of an elongated stuffing tube of a sausage encasing machine adapted to pump meat emulsion through a stuffing tube with a shirred telescopic casing therein wherein the stuffing tube has an outside diameter equal to the interior diameter of the telescopic casing positioned on said stuffing tube, comprising, selecting a length of shirred casing having a known interior diameter, forming a plurality of apertures in a wall member on said machine having diameters corresponding to the interior diameters of a plurality of shirred casings usable on said machine, placing indicia adjacent said apertures to indicate the respective diameters thereof, selecting a stuffing tube to be used in conjunction with said shirred casing having a known interior diameter, inserting one end of said selected stuffing tube into one of the apertures corresponding with the known interior diameter of said casing having a known interior diameter, and determining if said selected stuffing tube has a diameter of the same size as the aperture into which it is inserted.

8. The method of claim 7 wherein said aforesaid steps are repeated with stuffing tubes of different diameters until one of said stuffing tubes has an outside diameter which matches the aperture with a diameter of the selected casing having a known diameter.

* * * * *

UNITED STATES PATENT AND TRADEMARK OFFICE
CERTIFICATE OF CORRECTION

PATENT NO. : 5,813,906
DATED : September 29, 1998
INVENTOR(S) : Robert Wright Phillips It is certified that error appears in the above-identified patent and that said Letters Patent is hereby corrected as shown below:

Column 3, line 35, delete the word "of".

Column 3, line 36, before the word "interior" insert the word -- the --.

Signed and Sealed this

Sixth Day of April, 1999

Attest:

Attesting Officer

Q. TODD DICKINSON

Acting Commissioner of Patents and Trademarks